United States Patent
Kitabayashi

(10) Patent No.: US 8,295,314 B2
(45) Date of Patent: Oct. 23, 2012

(54) FIBER LASER HAVING SUPERIOR RESISTANCE TO REFLECTION LIGHT

(75) Inventor: Tomoharu Kitabayashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/648,031

(22) Filed: Dec. 28, 2009

(65) Prior Publication Data

US 2010/0135340 A1   Jun. 3, 2010

Related U.S. Application Data

(63) Continuation of application No. PCT/JP2008/061534, filed on Jun. 25, 2008.

(30) Foreign Application Priority Data

Jun. 27, 2007   (JP) .................................. 2007-169042

(51) Int. Cl.
H01S 3/30   (2006.01)
H01S 3/10   (2006.01)

(52) U.S. Cl. .................................. 372/6; 372/21; 372/22

(58) Field of Classification Search ........... 372/6, 21–22
See application file for complete search history.

(56) References Cited

U.S. PATENT DOCUMENTS

| | | | |
|---|---|---|---|
| 5,745,284 A | 4/1998 | Goldberg et al. | |
| 5,864,644 A | 1/1999 | DiGiovanni | |
| 5,880,877 A * | 3/1999 | Fermann et al. | 359/341.31 |
| 6,014,249 A | 1/2000 | Fermann et al. | |
| 6,340,806 B1 | 1/2002 | Smart et al. | |
| 6,972,894 B2 * | 12/2005 | Bjarklev et al. | 359/332 |
| 7,420,994 B2 | 9/2008 | Korolev et al. | |
| 2002/0034199 A1 | 3/2002 | Galvanauskas et al. | |
| 2002/0054733 A1 | 5/2002 | Kagi et al. | |
| 2003/0234973 A1 | 12/2003 | Yamaguchi et al. | |
| 2005/0190802 A1 * | 9/2005 | Richardson et al. | 372/25 |
| 2005/0226286 A1 | 10/2005 | Liu et al. | |
| 2007/0091948 A1 * | 4/2007 | Di Teodoro et al. | 372/39 |
| 2009/0204110 A1 * | 8/2009 | Islam | 606/9 |
| 2010/0085632 A1 | 4/2010 | Henderson | |

(Continued)

FOREIGN PATENT DOCUMENTS

EP   1353460 A1   10/2003

(Continued)

OTHER PUBLICATIONS

Michihiro Nakai et al., 30W Q-SW fiber laser, Proceedings of SPIE, Fiber LasersIV: Technology, Systems, and Applications, vol. 6453, Feb. 22, 2007.

(Continued)

*Primary Examiner* — Jessica Stultz
*Assistant Examiner* — Phillip Nguyen
(74) *Attorney, Agent, or Firm* — Sughrue Mion, PLLC

(57) ABSTRACT

An MO-PA fiber laser having a master oscillator; and a first power amplifier which uses as a gain medium, a rare earth-doped optical fiber which is connected to a later stage of the master oscillator, wherein the MO-PA fiber laser has a wavelength conversion portion between the master oscillator and the power amplifier, and has a wavelength filter between the wavelength conversion portion and the master oscillator which only allows wavelength components of pulse light emitted from the master oscillator to pass, thereby making it possible to prevent breakage to a fiber laser which is caused by reflection light without using high-cost optical components.

7 Claims, 8 Drawing Sheets

U.S. PATENT DOCUMENTS

2010/0246207 A1* 9/2010 Furuya et al. .................. 362/553

FOREIGN PATENT DOCUMENTS

| JP | 3-242627 A | 10/1991 |
| JP | 2619096 B2 | 3/1997 |
| JP | 2619096 B2 | 6/1997 |
| JP | 10-213827 A | 8/1998 |
| JP | 2000235202 A | 8/2000 |
| JP | 2002-006348 A | 1/2002 |
| JP | 2002-296630 A | 10/2002 |
| JP | 2003-035919 A | 2/2003 |
| JP | 2003-143081 A | 5/2003 |
| JP | 2003-298527 A | 10/2003 |
| JP | 2004-227011 A | 8/2004 |
| JP | 2005-102107 A | 4/2005 |
| JP | 2007-042981 A | 2/2007 |
| JP | 2007-114335 A | 5/2007 |
| JP | 2007-221037 A | 8/2007 |
| RU | 2269849 C2 | 2/2005 |
| WO | 2006/096440 A1 | 9/2006 |

OTHER PUBLICATIONS

G. Bouwmans et al., "Fabrication and characterization of an all-solid 2D photonic bandgap fiber with a low-loss region (<20 dB/km) aroung 1550 nm," Optics Express 17, vol. 13, No. 21, 2005, pp. 8452-8459.

Communication dated Jan. 17, 2012 from the Japanese Patent Office in counterpart Japanese application No. 2008-554354.

Communication dated Feb. 27, 2012 from the Russian Federal Service for Intellectual Property in counterpart Russian application No. 2010102046/28(002847).

* cited by examiner

FIBER LASER HAVING SUPERIOR RESISTANCE TO REFLECTION LIGHT

This application is a Continuation Application of International Patent Application No. PCT/JP2008/061534, filed on Jun. 25, 2008, which claims priority from Japanese Patent Application No. 2007-169042, filed on Jun. 27, 2007, the contents of which are incorporated herein by reference.

TECHNICAL FIELD

The present invention relates to an MO-PA fiber laser, and particularly to a fiber laser having superior resistance to reflection light in pulse light output.

TECHNICAL BACKGROUND

In recent years, as a result of advances in the development of high output fiber lasers, fiber lasers have begun to be used in a variety of fields such as processing machinery, medical equipment, measuring instruments and the like. In particular, in the field of material processing, because fiber lasers have superior light focusing abilities compared to other lasers and allow an extremely small beam spot having a high power density to be obtained, they make it possible for precision processing to be performed. Moreover, they also enable non-contact processing and processing of hard substances which are able to absorb laser light to be performed so that, as a result, the use of these fiber lasers is spreading rapidly.

Pulse output fiber lasers generally have an MO-PA structure in which comparatively low-power pulse light is emitted by a master oscillator (MO: Master Oscillator), and this pulse light is then amplified to a desired output by an optical fiber amplifier (PA: Power Amplifier). A schematic structural view of an MO-PA type of high output fiber laser is shown in FIG. 1. When it is not possible for pulse light to be amplified to a desired output using a single power amplifier, then in some cases a plurality of cascade-connected power amplifiers are used.

However, an MO-PA type of optical fiber laser, and particularly a high output fiber laser which outputs 10 W or more has the drawback that it is easily damaged by reflection light. For example, when processing is being performed using a fiber laser, there are cases when laser light output from the fiber laser is reflected by a surface of an object being processed, and a portion of this laser light gets returned to the fiber laser. Although this reflection light is faint, it is amplified as it passes through the PA towards the MO so that the power thereof increases, and there are cases when the optical components making up the MO and optical components located between the MO and the PA are damaged.

Moreover, pulse light becomes amplified in the PA, and during the time until the next pulse light is irradiated into the PA, ASE (Amplified Spontaneous Emission) light is output from the rare earth-doped optical fiber which is used in the PA. When this light is reflected by the object being processed and becomes irradiated once again into the PA, there are cases in which parasitic oscillation is generated. If parasitic oscillation is generated, then pulse light having an extremely high peak value is emitted from the PA towards the MO, and there are cases when the optical components making up the MO and optical components located between the MO and the PA are damaged by this pulse light.

As is disclosed, for example, in Patent document 1, consideration has been given to the use of an isolator in order to protect the optical components of the MO and optical components located between the MO and the PA from reflection light. Here, in a power amplifier which is used for optical communication, it is proposed that an isolator be used in order to prevent ASE light which is emitted from a latter-stage power amplifier being irradiated onto a prior-stage power amplifier. In the same way, in a fiber laser, it is possible to prevent reflection light being irradiated onto optical components located in the MO and between the MO and the PA by providing an isolator immediately in front of the PA.

[Patent document 1] Japanese Patent No. 2619096
[Patent document 2] Japanese Unexamined Patent Application, First Publication No. 2002-296630
[Patent document 3] U.S. Pat. No. 5,864,644
[Non-patent document 1] "Fabrication and characterization of an all-solid 2D photonic bandgap fiber with a low-loss region (<20 dB/km) around 1550 nm," G. Bouwmans, OPTICS EXPRESS 17, Vol. 13, No. 21, 2005, pp 8452-8459

DISCLOSURE OF THE INVENTION

Problems to be Solved by the Invention

However, as is disclosed in Patent document 1, even if an isolator is used, this isolator only functions normally while the fiber laser output is not more than a comparatively low several hundred mW. Although isolators which are able to be used up to approximately several W are commercially available, they are extremely expensive.

Furthermore, the insertion loss of an isolator is largely dependent upon a Faraday rotator which is one of the component elements of the isolator. However, only limited materials can be used for a Faraday rotator, and in many cases it is difficult to obtain an isolator which has low loss in a desired wavelength band. In particular, when an isolator is used in a location through which laser light of several W or more is transmitted, even if only a slight loss (normal Faraday rotator loss is approximately 0.5 dB) occurs, heat is generated from that loss which leads to damage.

Furthermore, parasitic oscillation can be generated in any wavelength within the fluorescent wavelength region (in a wavelength region of approximately 100 nm) of the rare earth-doped optical fire used in a PA, however, sufficiently large isolation can be obtained from an isolator in a wavelength region of approximately 10 nm, while isolation is low outside this wavelength, and there are cases when it is not possible to prevent the occurrence of parasitic oscillation.

The present invention was conceived in view of the above described circumstances, and it is an object thereof to provide a high pulse output MO-PA fiber laser in which breakage of the fiber laser from reflection light can be prevented without expensive optical components needing to be used.

Means for Solving the Problem

In order to achieve the above described object, the present invention provides an MO-PA fiber laser which has: a master oscillator; and a first power amplifier which users as again medium a rare earth-doped optical fiber which is connected to a later stage of the master oscillator, wherein the MO-PA fiber laser has a wavelength conversion portion between the master oscillator and the power amplifier, and has a wavelength filter between the wavelength conversion portion and the master oscillator which only allows wavelength components of pulse light emitted from the master oscillator to pass.

In the fiber laser of the present invention, it is preferable for a wavelength filter to be provided between the wavelength conversion portion and the power amplifier, and this wavelength filter only allows the wavelength of pulse light which was emitted from the master oscillator and was then subjected to wavelength conversion in the wavelength conversion portion to pass.

In the fiber laser of the present invention, it is preferable for the wavelength conversion portion to convert the wavelength of pulse light emitted from the master oscillator to a wavelength capable of being amplified by the first power amplifier.

In the fiber laser of the present invention, it is preferable for the wavelength conversion portion to be a wavelength conversion fiber which generates induced Raman scattering.

In the fiber laser of the present invention, it is preferable for the wavelength conversion fiber to be a photonic bandgap fiber.

In the fiber laser of the present invention, it is preferable for the wavelength conversion portion to be a second power amplifier.

In this fiber laser, it is preferable for there to be further provided a seed light source to facilitate wavelength conversion, and in synchronization with the master oscillator, for the seed light source to emit light which has the same wavelength as the wavelength of the pulse light which was emitted from the master oscillator and was then subjected to wavelength conversion in the second wavelength conversion portion, and for this light to be irradiated into the second power amplifier from the same direction as the pulse light is irradiated from the master oscillator.

Effects of the Invention

Because the fiber laser of the present invention has a structure in which a wavelength conversion portion is provided between the master oscillator (MO) and the power amplifier (PA), and in which a wavelength filter is provided between the wavelength conversion portion and the master oscillator which only allows wavelength components of pulse light emitted from the master oscillator to pass, because the wavelength of the pulse light emitted from the master oscillator is different from the wavelength of reflection light pulses, without using an isolator it is possible to protect components from the reflection light pulses by using a wavelength filter such as a BPF or the like in front of and behind the wavelength converter.

Moreover, because it is not necessary to use an extremely expensive isolator, the cost of the fiber laser can be lowered.

Moreover, because Raman scattering is used in the wavelength conversion, wavelength conversion can be performed irrespective of the wavelength of the pulse light emitted from the master oscillator.

Moreover, because it is possible to increase the power of the pulse light irradiated into the PA by using a power amplifier for the wavelength conversion, only a small amount of excitation power is needed to obtain a desired output, and the costs of the fiber laser can be kept in check.

Moreover, because it is possible to increase the power of the pulse light irradiated into the PA by using a power amplifier for the wavelength conversion, only a small amount of excitation power is needed to obtain a desired output, and parasitic oscillation can be suppressed in the PA. As a result, the reliability of a fiber laser can be improved.

DESCRIPTION OF THE REFERENCE NUMERALS

100 . . . Fiber laser, 110 . . . MO, 120 . . . PA, 130 . . . Wavelength converter, 140 . . . First wavelength filter, 150 . . . Second wavelength filter, 111 . . . Excitation light source, 112 . . . WDM coupler, 113 . . . Rare earth-doped optical fiber, 114 . . . Isolator, 115 . . . Output coupler, 117 . . . Band-pass filter, 118 . . . Optical switch, 121 . . . Excitation light source, 122 . . . Signal port, 123 . . . Photo coupler, 124 . . . Emission port, 125 . . . Rare earth-doped double clad fiber, 500 . . . PBGF, 501 . . . Low refractive index region, 502 . . . High refractive index portion

BEST EMBODIMENTS FOR IMPLEMENTING THE INVENTION

Embodiments of the present invention will now be described with reference made to the drawings.

Figure 1:
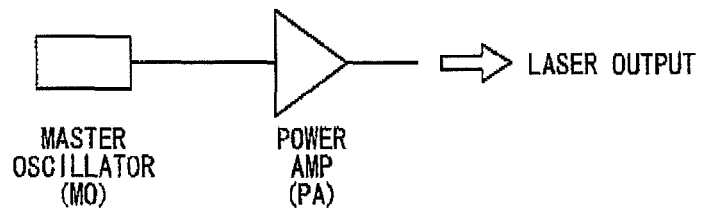
FIG. 1 is a structural view showing an example of the basic structure of an MO-PA fiber laser.
Figure 2:
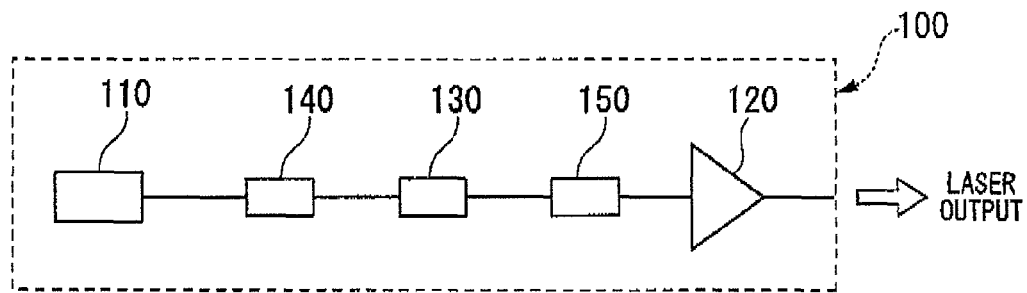
FIG. 2 is a structural view showing an embodiment of the fiber laser of the present invention.

FIG. 2 is a structural view showing an embodiment of the fiber laser of the present invention. A fiber laser 100 of the present embodiment is formed by providing a wavelength converter 130 between a master oscillator (referred to below as an MO) 110 and a power amplifier (referred to below as a PA) 120, and by providing a first wavelength filter 140 between the MO 110 and the wavelength converter 130, and by providing a second wavelength filter 150 between the wavelength converter 130 and the PA 120. The first wavelength filter 140, the wavelength converter 130, and the second wavelength filter 150 which are provided between the MO-PA perform the following operations when pulse light emitted from the MO 110 passes through them towards the PA 120.

The pulse light emitted from the MO 110 passes through the first wavelength filter 140 and enters the wavelength converter 130. The wavelength converter 150 converts the wavelength of the input pulse light. The wavelength after this conversion is within the gain wavelength band of the PA 120 so that it can be amplified to the desired output by the PA 120. The second wavelength filter 150 receives the pulse light whose wavelength has been converted by the wavelength converter 150, and blocks components thereof whose wavelength was not converted by the wavelength converter 150. In this manner, pulse light which has passed through the second wavelength filter 150 is amplified to the desired output by the PA 120 and is then output.

The first wavelength filter 140, the wavelength converter 130, and the second wavelength filter 150 also perform the following operations on reflection light. When laser light which has already been output is irradiated once again into the PA 120 due to it being reflected by external objects or the like, even if there is only a tiny quantity of reflection light, this becomes amplified as it passes through the PA 120 so as to become high intensity pulses and enter the second filter 150. Because the reflection light pulses which have entered the second wavelength filter 150 have the same wavelength as the pulses irradiated into the PA 120 from the wavelength converter 150, they are able to pass along without being blocked by the second wavelength filter 150, and enter the wavelength converter 130. The reflection light pulses passing through the wavelength converter 130 do become irradiated into the first wavelength filter 140, however, because the wavelength of the reflection light pulses is a different wavelength from the wavelength of the pulse light originally emitted from the MO 110, they are blocked by the first wavelength filter 140. As is described above, because it is possible to block reflection light pulses entering the MO 110 without using an isolator, it is possible to prevent the components inside the MO 110 being damaged by reflection light.

Specific examples are described below.

Example 1

Figure 3:
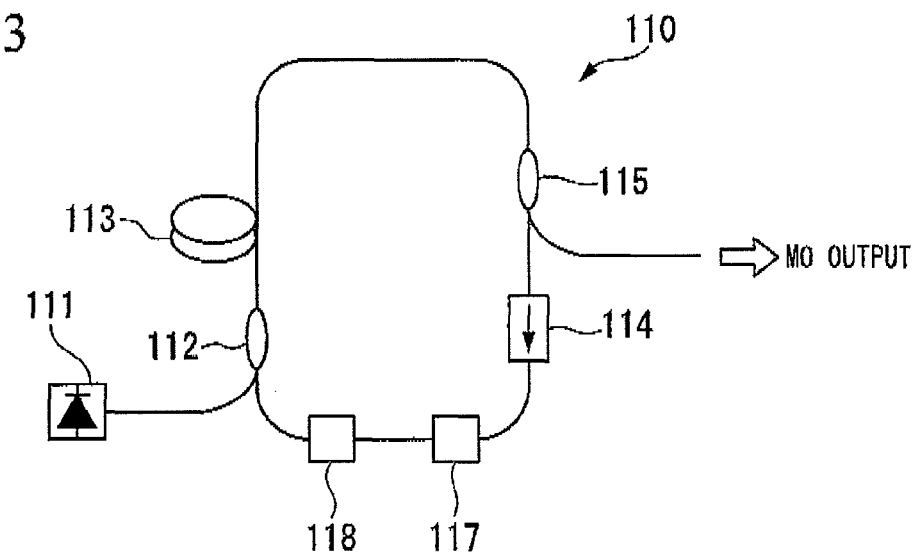
FIG. 3 is a structural view showing an example of the structure of an MO in the fiber laser of the present invention.

The MO 110 is a laser oscillator, and a fiber ring laser is used for the MO 110 in the present example. As is shown in FIG. 3, this fiber ring laser is formed by a pumping light source 111, a WDM coupler 112 which couples the pumping light with laser light, a rare earth-doped optical fiber 113 which serves as a gain medium, an isolator 114, a band-pass filter 117, an optical switch 118, and an output coupler 115. Excitation light emitted from the pumping light source 111 is irradiated into the rare earth-doped optical fiber 113 via the WDM coupler 112. The pumping light irradiated into the rare earth-doped optical fiber 113 is absorbed by rare earth ions with which the core of the rare earth-doped optical fiber 113 has been doped, so that the rare earth ions are placed in an excited state. The rare earth ions which are in an excited state emit spontaneous emission light of a specific wavelength. This spontaneous emission light is propagated through the interior of the rare earth-doped optical fiber 113 while it is being amplified, and is output as an ASE (Amplified Spontaneous Emission). The WDM coupler 112, the rare earth-doped optical fiber 113, the isolator 114, the discharge coupler 115, the band-pass filter 117, and the optical switch 118 are connected in a ring state, and the ASE of the wavelength of the transmission bandwidth of the band-pass filter 117 travels around through these components and is amplified again by the rare earth-doped optical fiber 113. Eventually, laser oscillation occurs and a portion thereof is output as laser light via the output coupler 115. The optical switch element 117 normally makes CW emissions if left in a low-loss state, and the laser output is output as continuous light. If the optical switch element 117 is made to switch cyclically between a low-loss state and a high-loss state, then pulse light is emitted and a pulse laser output can be obtained.

In the present example, the rare earth-doped optical fiber 113 of the MO 110 is formed by doping Yb ions in a core having a core diameter of 4 µm, so as to form an optical fiber having an absorption rate of 500 dB/m@976 nm. The pumping light source which is used oscillates at a wavelength of 976 nm so as to excite the Yb ions with which the core of the rare earth-doped optical fiber has been doped, while an acousto-optic modulator (AOM) is used for the optical switch element. When the pumping light source was driven so that an output of 500 mW was obtained and the AOM was operated at a frequency of 20 kHz, a pulse output having a pulse width of 50 ns and a peak power of approximately 70 W was obtained as the MO output.

As the MO 110, instead of this type of fiber ring laser, it is also possible to use a combination of, for example, a Fabry-Perot type of fiber laser in which a resonator mirror is provided at both ends of a rare earth-doped optical fiber or a semiconductor laser which outputs continuous light with an external modulator.

Figure 4:
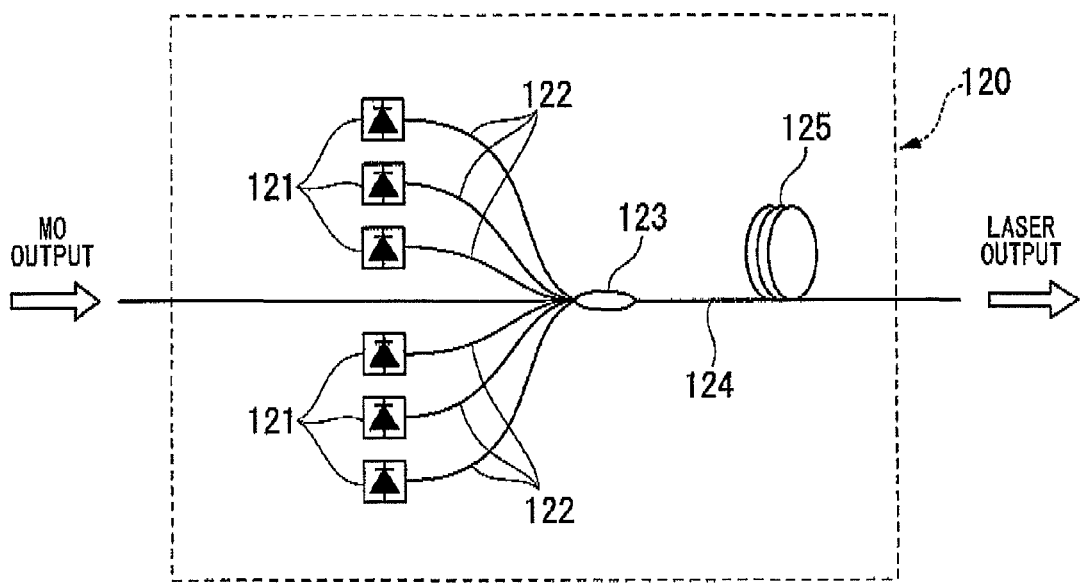
FIG. 4 is a structural view showing an example of the structure of a PA in the fiber laser of the present invention.

In contrast, for the PA 120, a PA having a structure such as that shown in FIG. 4 is used.

This PA 120 is formed by a pumping light source 121, an optical coupler 123, a rare earth-doped double clad fiber 125, and a pumping light source 121. The optical coupler 123 may be formed by an optical coupler such as that disclosed, for example, in Patent document 3. This optical coupler 123 has a plurality of excitation ports 122 which are formed by multimode optical fibers, and one signal port 122 which is formed by a single mode fiber, and has a single discharge port 124 which is formed by melt-drawing these ports into an integrated unit.

Laser light emitted from the MO 110 is irradiated from the signal ports 122, and is irradiated into the core of the rate earth-doped double clad fiber 125 via the optical coupler 123. The pumping light sources 121 are connected to one side of the excitation ports 122, and the pumping light is irradiated into a first cladding of the rare earth-doped double clad fiber 125 via the optical coupler 123. The pumping light which is irradiated into the first cladding of the rare earth-doped double clad fiber 125 is absorbed by the rare earth ions with which the core has been doped so that a population inversion is formed, and as a result of a stimulated emission being generated, the laser light propagating through the core interior is amplified and is output as a laser output.

In the present example, an Yb-doped double clad fiber which has had ytterbium ions doped in the core thereof is used for the rare earth-doped double clad fiber 125 of the PA 120, and this fiber has a core diameter of 6 µm, a first cladding diameter of 125 µm, and a core absorption of 1200 dB/m at 976 nm. A pumping light source having a wavelength of 915 nm was used for the pumping light source in order to excite the Yb ions. The output per pumping light source was 6 W, so that by using 12 light sources, it was possible to irradiate a maximum of 72 W of pumping light. The number of pumping light sources (i.e., the maximum power) is adjusted in accordance with the required laser output. If the desired output cannot be obtained from the output from the PA 120, it is possible to provide a PA having the same structure at a downstream point from the PA 120 so as to amplify the output to the desired output.

A wavelength conversion fiber was used for the wavelength converter 130. This wavelength conversion fiber is a fiber in which, when high intensity light is irradiated therein, the wavelength of incident light is shifted to the long wavelength side by induced Raman scattering. The light intensity which generates induced Raman scattering can be adjusted by means of the core diameter and fiber length of the wavelength conversion optical fiber. In the present example, by using 50 m of a single mode fiber having a core diameter of 6 μm, if the peak value of the pulse light irradiated into the wavelength conversion fiber exceeds approximately 50 W, then wavelength conversion by means of induced Raman scattering occurs.

Figure 5:
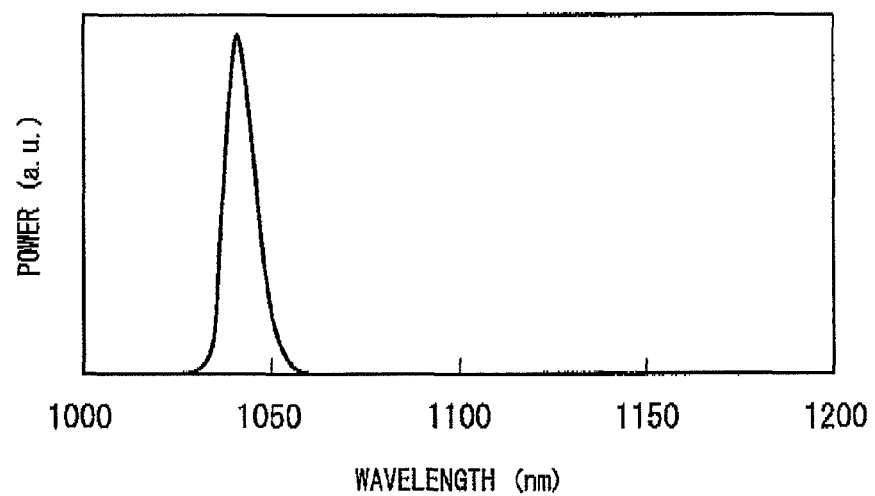
FIG. 5 is a view showing the wavelength spectrum of pulse light emitted from the MO of a fiber laser prepared in Example 1.
Figure 6:
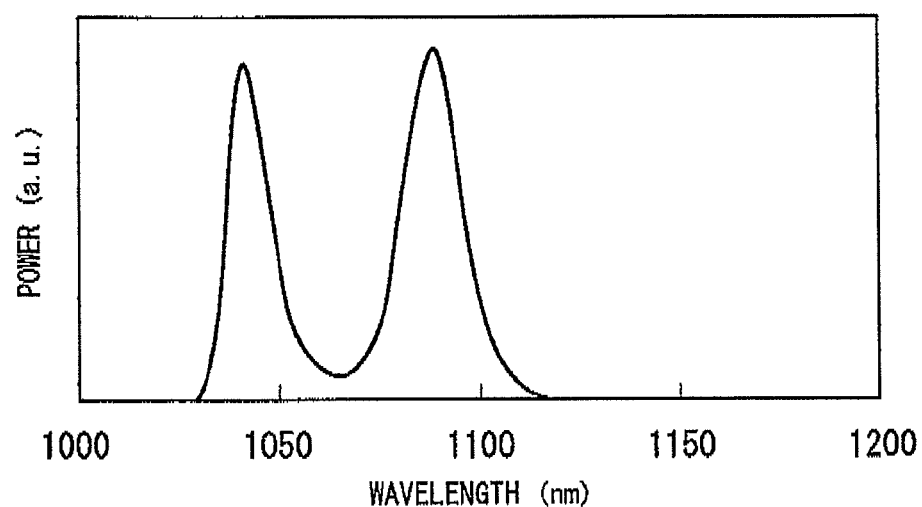
FIG. 6 is a view showing the wavelength spectrum of pulse light which has undergone wavelength conversion in Example 1.
Figure 8:
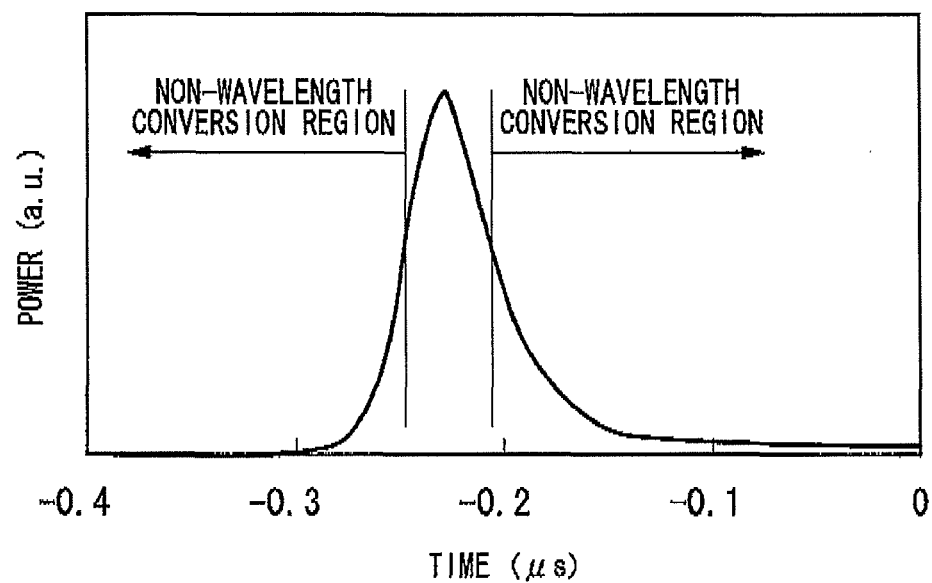
FIG. 8 is a view illustrating changes in the pulse waveform during wavelength conversion in Example 1.

Because the pulse light emitted from the MO 110 of the present example has a peak value of approximately 70 W, sufficient wavelength conversion is able to take place. The wavelength of the pulse light emitted from the MO 110 is 1040 nm, as is shown in FIG. 5, and when this pulse light passes through the wavelength conversion optical fiber, as is shown in FIG. 6, the wavelength of this pulse light is shifted by Raman scattering to approximately 1090 nm. In FIG. 6, only light having a wavelength of 1090 nm (i.e., 1st Raman light) is generated, however, if adjustments are made in order to make induced Raman scattering occur more easily such as by extending the fiber length or reducing the core diameter or the like, then it becomes possible to perform wavelength conversion at even longer wavelengths, for example, at 1140 nm (i.e., 2nd Raman light). In the present example, pulse light undergoes wavelength conversion only at 1090 nm so that pulse amplification by the Yb-doped double clad fiber 125 of the PA 120 which is connected at a later stage is possible. Moreover, if the temporal waveform of the pulse light is completely square, then complete wavelength, conversion to 1090 nm is possible, however, the temporal waveform of the pulses actually emitted from the MO 110 is a shape such as that shown in FIG. 8, so that wavelength conversion does not occur in the pulse leading edges and pulse trailing edges, and wavelength conversion occurs at approximately the pulse peak. Because of this pulse light in which both 1040 nm and 1019 nm wavelength components are included is emitted in the output light from the wavelength conversion fiber.

Figure 7:
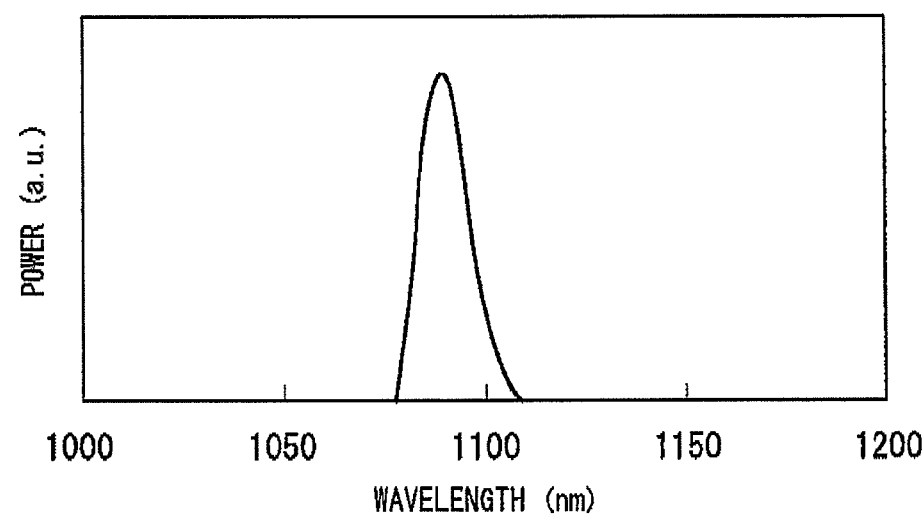
FIG. 7 is a view showing the wavelength spectrum of light which has undergone wavelength conversion and has passed through a wavelength filter in Example 1.
Figure 9:
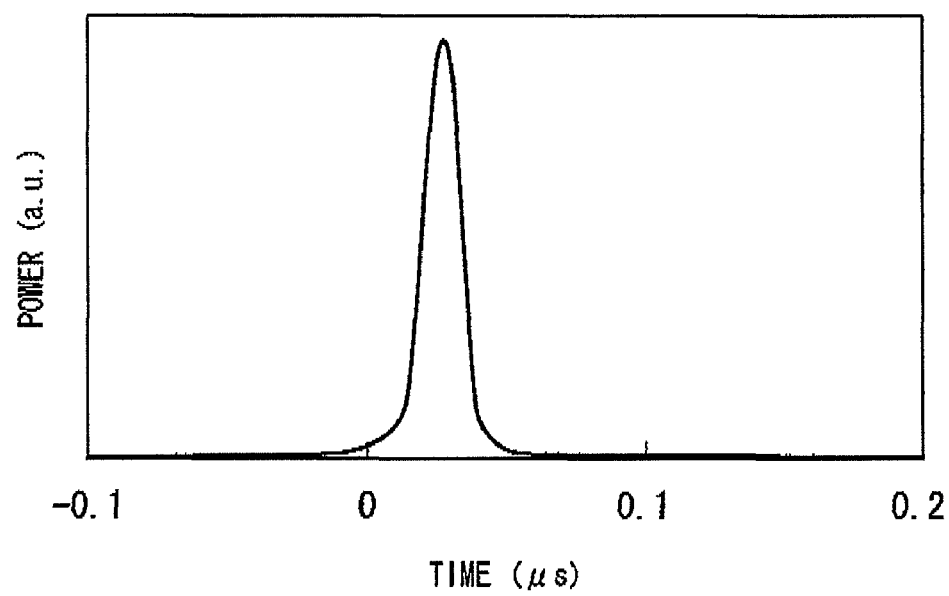
FIG. 9 is a view showing the pulse waveform after wavelength conversion in Example 1.

A band-pass filter which is designed so as to transmit light in the vicinity of a wavelength of 1040 nm from among the pulse light emitted from the MO 110 is used for the first wavelength filter 140, while a band-pass filter which is designed so as to transmit light in the vicinity of the after conversion wavelength of 1090 nm is used for the second wavelength filter 150. A dielectric multilayer membrane filter is used for each filter. Accordingly, of the pulse light (see FIG. 6) emitted from the wavelength conversion fiber, only pulse light having wavelength components in the vicinity of the 1090 nm wavelength is allowed to pass through (see FIG. 7). At this time, the pulse waveform changes from the waveform shown in FIG. 8 to the waveform shown in FIG. 9, so that the pulse width also becomes narrower. As is described above, this is because the wavelength conversion is only generated in the vicinity of the pulse peak. Moreover, as a result of the pulse width being narrowed by the wavelength conversion, when it is amplified by the PA 120 it can be amplified to an even higher peak value.

The pulse light which has passed through the second wavelength filter 150 is irradiated into the PA 120 where it is amplified, and it is then output as a laser output. In the present example, because the pumping light power is 70 W, an output of 25 W is obtained, and pulses having a pulse width of 53 ns and a peak power of 25 kW are obtained.

Next, with the fiber laser being driven such that the laser output is 25 W, a mirror was placed at the emission end of the PA 120 so as to change the return loss and measurements were made of the average power of the reflection light pulses returning from the PA 120 to the MO 110 and of the power of the reflection light pulses passing through the first wavelength filter 140 and entering the MO 110. The results thereof are shown in FIG. 10.

Figure 10:
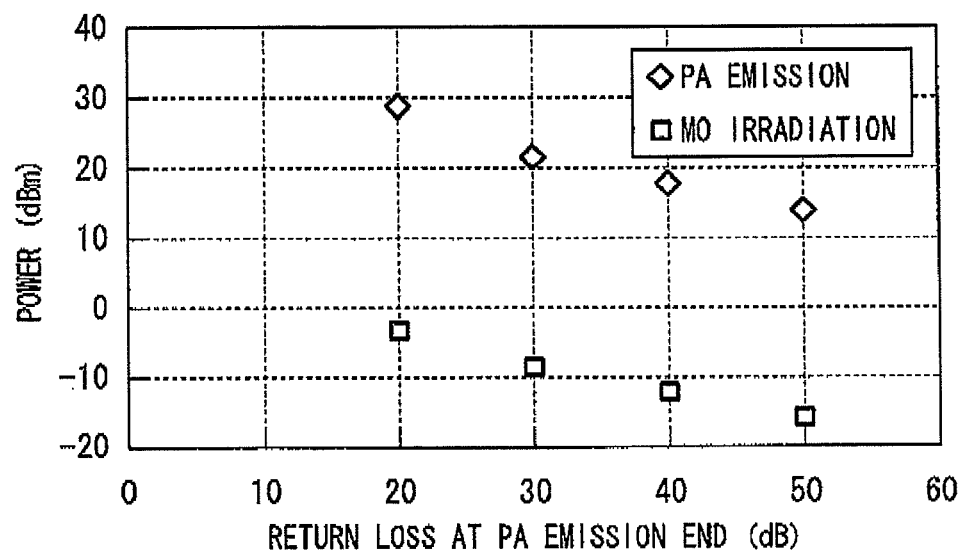
FIG. 10 is a diagram showing measurement results for an average power of reflection light pulses returning from the PA to the MO and for the power of reflection light pulses which have passed through a first wavelength filter and entered the MO.

As is shown in FIG. 10, at the maximum power, approximately 30 dBm (1 W) of reflection light pulses were emitted from the PA 120 towards the MO 110. Even if 1 W of reflection light pulses enter the MO 110, the optical components used in the MO 110 are damaged. However, the power of the reflection light pulses actually entering the MO 110 was kept to 0 dBm (1 mW) or less.

The reason for this is that, because the first wavelength filter 140 only allows light having the same wavelength as the MO 110 to pass, when reflection light pulses which have undergone wavelength conversion and whose wavelength has been changed pass through the first wavelength filter 140, they are blocked. Normally, the optical components used in the MO 110 are not damaged provided that the power is 100 mW. Moreover, because dielectric multilayer membranes having superior properties to handle power are used for the wavelength filters 140 and 150, they are not damaged even when blocking high intensity reflection light pulses. In addition, expensive isolators are also not required.

Here, a wavelength conversion technology in which wavelength conversion is achieved by Raman scattering which is generated as a result of signal light being irradiated into a highly nonlinear fiber, and thereafter only the wavelength components after the wavelength conversion are extracted by a wavelength filter is disclosed, for example, in Patent document 2. If this structure is provided between the MO 110 and the PA 120 of the present example, then when irradiation takes place from the MO 110 to the PA 120, wavelength conversion into pulse light which is capable of being amplified by the PA 120 is possible, however, reflection light passes through both the wavelength filter and the highly nonlinear fiber, and enters into the MO 110. As a result, using this structure it is not possible to protect the MO 110 from reflection light pulses.

Example 2

In Example 1, the wavelength spectrum of the Raman conversion had the form shown in FIG. 6, and there was considerable power loss when the light passed through the second wavelength filter 150. Even if the occurrence of Raman scattering was facilitated by adjusting the length of the wavelength conversion fiber and the like, because 2nd Raman light begins to be generated, it is not possible to increase the power of the 1st Raman light beyond this. Therefore, by using a photonic bandgap fiber (abbreviated below to PBGF) for the wavelength converter 130 in the same structure as that employed in Example 1, power loss is suppressed and an improvement in efficiency is achieved.

Figure 11:
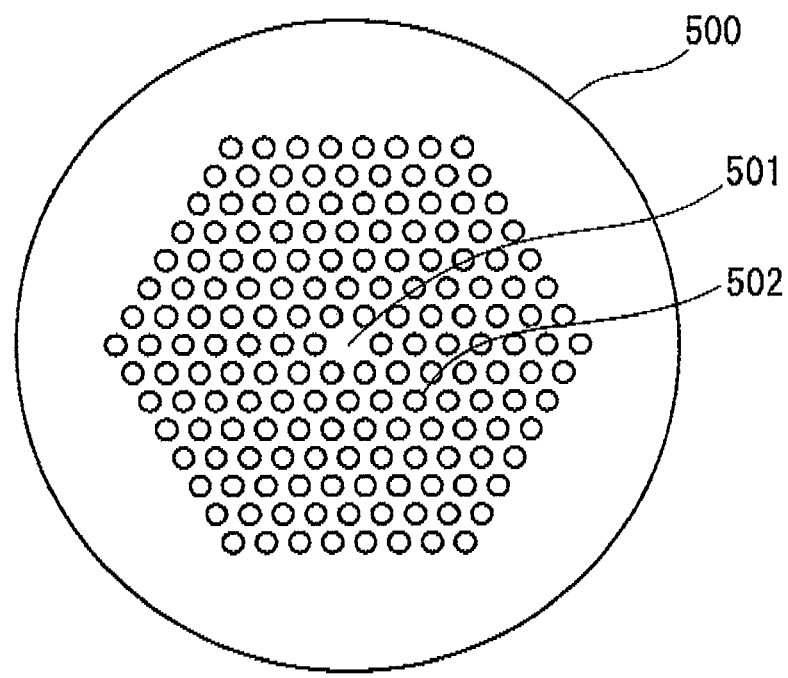
FIG. 11 is a cross-sectional view of a wavelength conversion PBGF used in Example 2.
Figure 12:
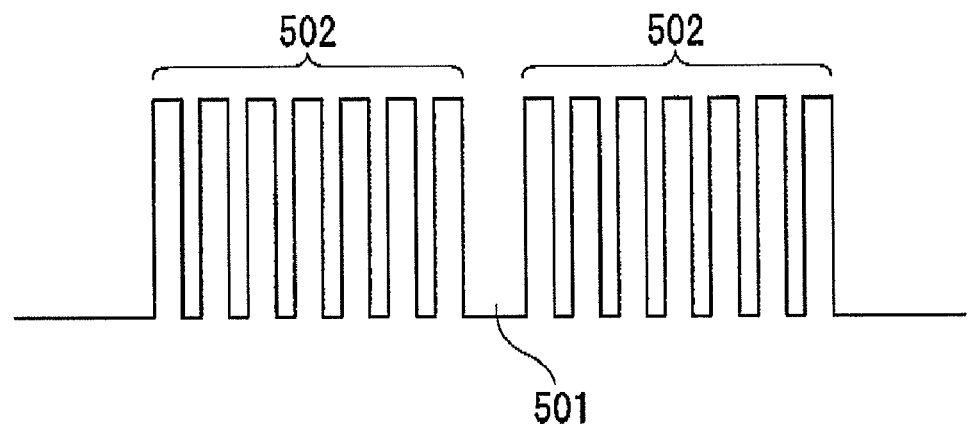
FIG. 12 is a view showing a refractive index profile in a radial direction of the wavelength conversion PBGF used in Example 2.

A PBGF is disclosed, for example, in Non-patent document 1. A cross-sectional view of a PBGF is shown in FIG. 11, while a refractive index profile in the radial direction thereof is shown in FIG. 12. This PBGF 500 has an area 501 in the center thereof which has the same low refractive index as pure quartz, and has a portion 502 surrounding the area 501 which has been formed with a higher refractive index through the addition of Ge or the like. This high refractive index portion is arranged in a triangular lattice-shaped periodic structure. By adjusting the diameter and spacings of this high refractive index portion, a photonic band having the desired wavelength band can be formed. When light is irradiated into the low refractive index area 501 of this PBGF 500, because light in the photonic bandgap wavelength region cannot be guided through the higher refractive index portion 502 which has been arranged in the periodic structure, it becomes confined in the low refractive index area 501, and is guided through the core area. This is different from the waveguide principle governing optical fibers used in conventional optical communication and the like. Because light in wavelength regions other than this can also be guided through the periodic structure, it radiates outwards in its existing form over the entire surface of the fiber. Namely, an optical fiber is formed in which, in the wavelength regions of the photonic bandgap, the low refractive index regions function as a core towards light and the high refractive index regions function as cladding towards light.

In the present example, a photonic bandgap is placed in the wavelength regions of the pulse light emitted from the MO 110 and of the 1st Raman light thereof (i.e., 1020~1120 nm), while the PBGF 500 which is outside the wavelength band of the photonic bandgap is used as a wavelength conversion fiber in the wavelength regions of the 2nd Raman light (i.e., 1140 nm). By employing this type of structure, when pulse light emitted from the MO 110 travels towards the PA 120, the pulse light emitted from the MO 110 as well as the 1st Raman light thereof are propagated while being confined to the core region, and Raman scattered light generated by the 1st Raman light is discharged before it undergoes induced Raman scattering without being propagated along the core region. Provided that induced Raman scattering does not occur, because it is possible to effectively suppress wavelength conversion from 1st Raman light to 2nd Raman light, by using this PBGF 500 it is possible to generate more 1st Raman light than is generated using the wavelength conversion optical fiber of Example 1.

Figure 13:
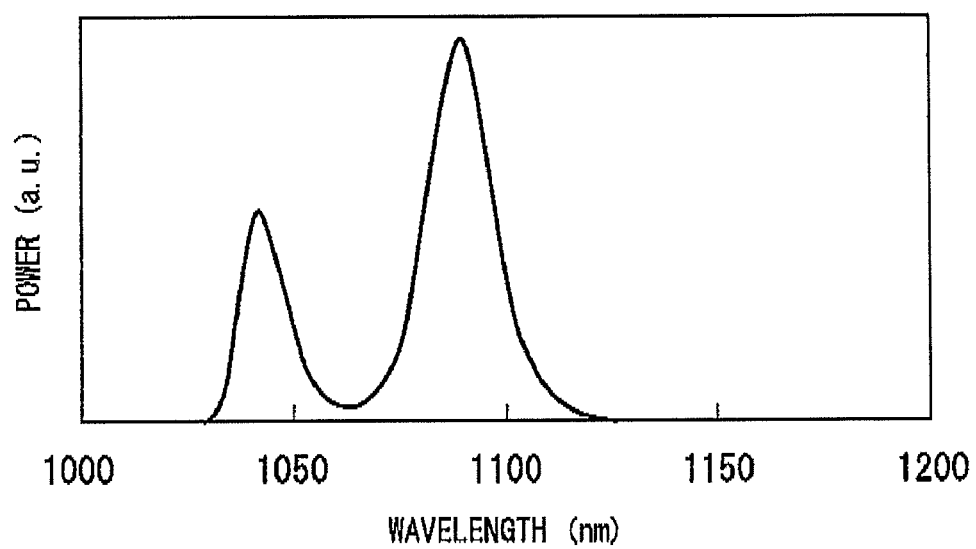
FIG. 13 is a view showing the output wavelength spectrum from the PBGF used as a wavelength converter in Example 2.

FIG. 13 shows the output wavelength spectrum from the PBGF 500 when the PBGF 500 was used as the wavelength converter 130. Compared with the case of Example 1 (see FIG. 6), it was possible to generate a greater amount of pulse light having a wavelength of 1090 nm. The loss occurring during passage through the second wavelength filter 150 was 3.5 dB in Example 1, while in the present example, this loss was reduced to 1.8 dB.

Moreover, by reducing this loss, the following effects were also obtained.

As a result of loss being reduced, the power of the pulse light input into the PA 120 is increased, so that the excitation power required to obtain an output of 25 W, which is the same as in Example 1, is decreased to 65 W. Namely, it is possible to obtain the same output as that obtained in Example 1 using less excitation power. The pumping light source in the fiber laser is one of the more expensive components thereof, and if it is possible to reduce the required excitation power, then this has a considerable effect towards lowering costs. Moreover, because it is possible to reduce the excitation power, it is possible to lower the gain of the rare earth-doped fiber and thereby make it more difficult for parasitic oscillation to occur. As a result, the effect is obtained that it is possible to improve the reliability of the fiber laser.

With the fiber laser being driven such that the laser output is 25 W, in the same way as in Example 1, a mirror was placed at the emission end of the PA 120 so as to set the return loss to 20 dB, and measurements were made of the average power of the reflection light pulses returning from the PA 120 to the MO 110 and of the power of the light pulses passing through the first wavelength filter 140 and entering the MO 110. As a result, it was found that, at the maximum power, approximately 29 dBm (0.8 W) of reflection light pulses were emitted from the PA 120 towards the MO 110. Accordingly, the power of the reflection light pulses entering the MO 110 was kept to −3 dBm (0.5 mW), so that substantially the same effects were obtained as those obtained from Example 1.

Example 3

In Example 2, by using a PBGF for the wavelength converter, power loss was suppressed so that efficiency was improved.

However, in order for satisfactory wavelength conversion to occur, an extremely long wavelength conversion fiber of the order of several tens of meters is necessary. Because of this, workability during the making of the laser is poor, and a considerable space is required for containment. In particular, as is shown in FIG. 12, because a PBGF presents a complex refractive index structure, manufacturability is worse than when a normal fiber is used and there is a consequent increase in costs.

Light entering the wavelength converter 130 generates light having a longer wavelength than incident light through natural Raman scattering as it is propagated through a PBGF. This natural Raman scattered light gradually accumulates as the incident light is propagated through the PBGF. When it reaches a particular intensity, an abrupt wavelength shift occurs due to induced Raman scattering.

Accordingly, the generation of 2nd Raman light occurs when the incident light approaches the emission side of the wavelength converter 130. Accordingly, even if the portion on the incident side of the wavelength converter 130 is not a PBGF fiber, provided that a PBGF is used for the emission side portion, then it is possible to suppress the generation of 2nd Raman light.

In light of the above, the following modifications were made to the laser of Example 2.

Figure 14:
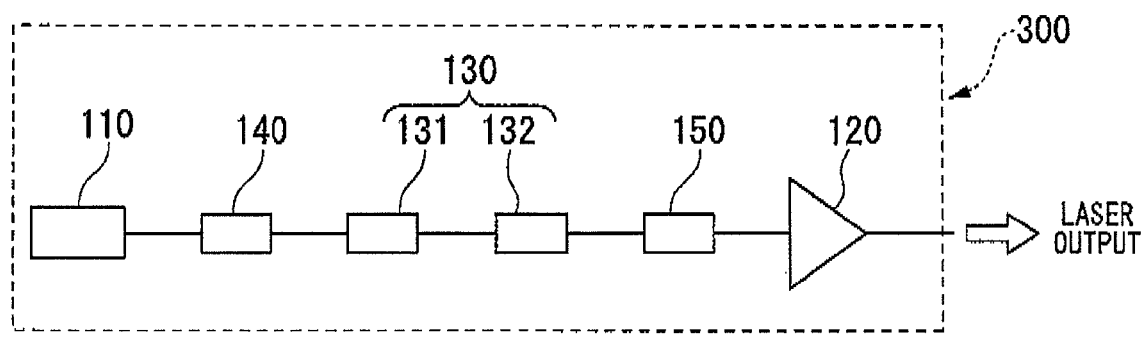
FIG. 14 is a view showing the structure of a fiber laser prepared in Example 3.

While the basic structure thereof remains the same as in Example 2, Example 3 differs in that the wavelength converter 130 is constructed from two portions such as those described below (see FIG. 14).

Figure 15:
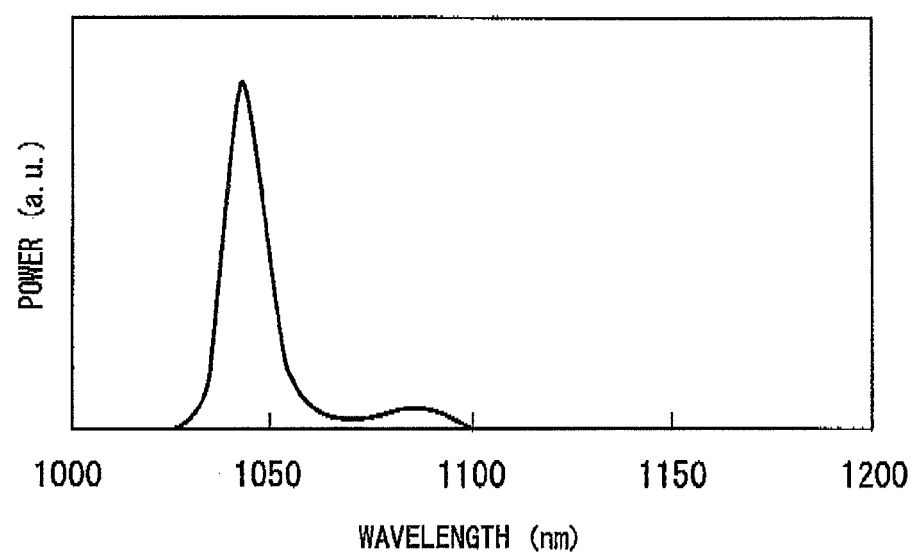
FIG. 15 is a view showing the wavelength spectrum of an output from the fiber laser prepared in Example 3.

A single mode fiber having a core diameter of 4 μm was used for a first wavelength converter 131. By making the core diameter smaller compared with Example 1, it is possible to increase the power density of the light being propagated through the core interior, and wavelength conversion can occur in a shorter optical fiber. The length of the fiber was adjusted to a length (15 m) at which 1st Raman light was slightly observed in the output light from the first wavelength converter 131. The output spectrum from the first wavelength converter is shown in FIG. 15.

A second wavelength converter was formed from 25 m of the same fiber as that used in Example 2. The output spectrum for this was the same as the output spectrum for the output from the PBGF in Example 2 (see FIG. 13), so that the wavelength converter 130 had identical functions as in the structure in Example 2.

Moreover, the PBGF used here had half the length compared to the examples, showing that it is possible to shorten the PBGF which is used.

Example 4

Figure 16:
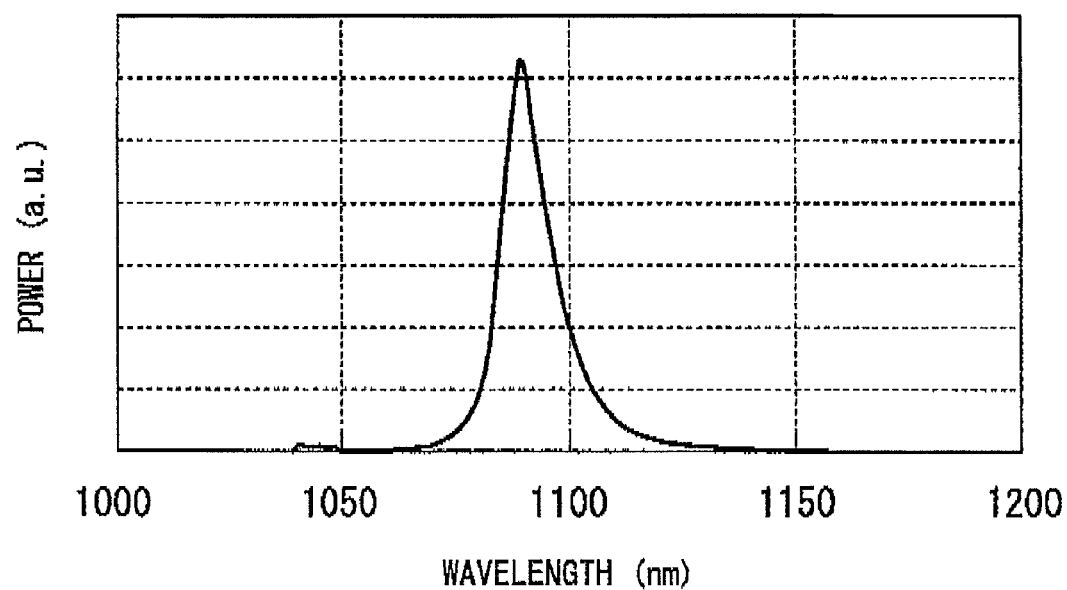
FIG. 16 is a view showing the wavelength spectrum of an output from a fiber laser prepared in Example 4.

An Yb-doped power amplifier was used as the wavelength converter 130. For the Yb-doped fiber, a fiber having a double clad structure with a core diameter of 6 μm and a cladding diameter of 120 μm was used, and the core absorption was 1200 dB/m (@ 976 nm). The length of this Yb-doped optical fiber and the intensity of the pumping light were adjusted such that the maximum gain wavelength of the Yb-doped optical fiber was in the vicinity of 1090 nm. When pulse light emitted from the MO 110 was irradiated thereon, an output such as that shown in FIG. 16 was obtained, and it was possible to convert the wavelength of the pulse light from 1040 nm to 1090 nm. Here, pulse light may in some cases also be generated at 1140 nm depending on the operating conditions of the power amplifier. This is because the pulse light whose wavelength has been converted to 1090 nm undergoes a wavelength shift due to Raman scattering, and if a large amount of this pulse light is generated, it may cause loss. Because of this, it is also possible to suppress wavelength shift which is caused by Raman scattering by using an Yb-doped optical fiber having a large core diameter, or by using a fiber obtained by doping YB ions into the core of the PBGF 500. It is also possible to facilitate wavelength shifting by inputting seed light from the same direction as the pulse light is irradiated from the MO 110 into the power amplifier. The seed light may be irradiated into the power amplifier in synchronization with the pulse light at the wavelength at which wavelength conversion is desired.

Next, the pulse light which has undergone wavelength conversion was amplified by the PA 120, and adjustments were made such that the laser output was 25 W. In the same way as in Example 1, a mirror was then placed at the emission end of the PA 120 so as to set the return loss to 20 dB, and measurements were made of the average power of the reflection light pulses returning from the PA 120 to the MO 110 and of the power of the reflection light pulses passing through the first wavelength filter 140 and entering the MO 110. As a result, it was found that, at the maximum power, approximately 29 dBm (0.8 W) of reflection light pulses were emitted from the PA 120 towards the MO 110. Accordingly, it was confirmed that the power of the reflection light pulses entering the MO 110 was kept to +8 dBm (6 mW). Because the reflection light was amplified when it passed through the power amplifier, the power of the reflection light pulses was greater compared with Example 1 and Example 2, however, it was still kept sufficiently small so that the optical components in the MO 110 were not broken.

Moreover, by using a power amplifier as the wavelength converter 130, it was possible to obtain effects which could not be obtained in Example 1 and Example 2. In the present example, while the power of the pulse light prior to wavelength conversion was 70 mW, the output after wavelength conversion was amplified up to 900 mW. Namely, the power of the pulse light irradiated into the PA 120 was able to be increased by a factor of 10 or more compared with Example 1 and Example 2. If the power of the pulse light irradiated into the PA 120 is increased, then it is possible to reduce the pumping light of the PA 120 which is required to obtain a predetermined output. Namely, because the gain of the PA 120 can be lowered, it is possible to prevent damage to the fiber laser caused by parasitic oscillation. The further merit is obtained that it is possible to decrease the number of pumping light lasers which make up the greatest proportion of the cost of a fiber laser.

INDUSTRIAL APPLICABILITY

According to the fiber laser of the present invention, it is possible to prevent breakage to a fiber laser which is caused by reflection light without using high-cost optical components.

What is claimed is:

1. A Master Oscillator Power Amplifier (MO-PA) fiber laser comprising:
   a master oscillator;
   a first power amplifier comprising as a gain medium, a rare earth-doped optical fiber;
   a wavelength conversion portion disposed on an optical path between the output of the master oscillator and the first power amplifier, the wavelength conversion portion being connected to the first power amplifier; and
   a first wavelength filter to which pulse light emitted from the master oscillator is incident, the first wavelength filter being disposed between the wavelength conversion portion and the master oscillator, the first wavelength filter being connected to the wavelength conversion portion and the master oscillator, the first wavelength filter only allowing wavelength components of pulse light emitted from the master oscillator to pass.

2. The fiber laser according to claim 1, further comprising:
   a second wavelength filter provided between the wavelength conversion portion and the first power amplifier, wherein the second wavelength filter only allows the wavelength of pulse light which was emitted from the master oscillator and was then subjected to wavelength conversion in the wavelength conversion portion to pass.

3. The fiber laser according to either claim 1 or claim 2, wherein the wavelength conversion portion converts the wavelength of pulse light emitted from the master oscillator to a wavelength capable of being amplified by the first power amplifier.

4. The fiber laser according to either claim 1 or claim 2, wherein the wavelength conversion portion is a wavelength conversion fiber which generates induced Raman scattering.

5. The fiber laser according to claim 4, wherein the wavelength conversion fiber is a photonic bandgap fiber.

6. The fiber laser according to either claim 1 or claim 2, wherein the wavelength conversion portion is a second power amplifier.

7. A Master Oscillator Power Amplifier (MO-PA) fiber laser comprising:
   a master oscillator;
   a first power amplifier comprising as a gain medium, a rare earth-doped optical fiber;
   a wavelength conversion portion disposed on an optical path between the output of the master oscillator and the first power amplifier, the wavelength conversion portion being connected to the first power amplifier;
   a first wavelength filter to which pulse light emitted from the master oscillator is incident, the first wavelength filter being disposed between the wavelength conversion portion and the master oscillator, the first wavelength filter being connected to the wavelength conversion portion and the master oscillator, the first wavelength filter only allowing wavelength components of pulse light emitted from the master oscillator to pass; and
   a seed light source to facilitate wavelength conversion, wherein:
      the wavelength conversion portion is a second power amplifier,
      in synchronization with the master oscillator, the seed light source emits light which has the same wavelength as the wavelength of the pulse light from the master oscillator which has been subjected to wavelength conversion in the second power amplifier, and
      the light emitted by the seed light source is irradiated into the second power amplifier from the same direction as the pulse light is irradiated from the master oscillator.

* * * * *